(12) United States Patent
Giustiniano et al.

(10) Patent No.: US 9,057,771 B2
(45) Date of Patent: Jun. 16, 2015

(54) CARRIER SENSE-BASED RANGING

(75) Inventors: Domenico Giustiniano, Zurich (CH);
Stefan Mangold, Liebefeld (CH)

(73) Assignee: Disney Enterprises, Inc., Burbank, CA (US)

( * ) Notice: Subject to any disclaimer, the term of this patent is extended or adjusted under 35 U.S.C. 154(b) by 177 days.

(21) Appl. No.: 13/455,033

(22) Filed: Apr. 24, 2012

(65) Prior Publication Data

US 2012/0269080 A1 Oct. 25, 2012

Related U.S. Application Data

(60) Provisional application No. 61/478,793, filed on Apr. 25, 2011.

(51) Int. Cl.
*H04W 24/00* (2009.01)
*H04B 1/00* (2006.01)
*G01R 31/08* (2006.01)
(Continued)

(52) U.S. Cl.
CPC ............ *G01S 5/0205* (2013.01); *H04W 64/00* (2013.01); *G01S 5/0215* (2013.01); *G01S 5/14* (2013.01); *G01S 13/876* (2013.01); *H04L 1/1607* (2013.01)

(58) Field of Classification Search
CPC ..... H04L 43/00; H04L 43/08; H04L 43/0852; H04L 43/0864; H04W 64/006; H04W 64/00; H04B 17/003; G01S 13/825; G01S 13/878; G01S 5/02
USPC ......... 375/130; 370/252; 455/456.1; 342/458
See application file for complete search history.

(56) References Cited

U.S. PATENT DOCUMENTS 6,486,831 B1 * 11/2002 Martorana et al. ............ 342/458
6,801,782 B2 * 10/2004 McCrady et al. ............. 455/517
(Continued)

FOREIGN PATENT DOCUMENTS

WO WO 2010059934 A2 * 5/2010

OTHER PUBLICATIONS

IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications, IEEE Computer Society, 2007.*
(Continued)

*Primary Examiner* — Benjamin H Elliott, IV
*Assistant Examiner* — Eric Nowlin
(74) *Attorney, Agent, or Firm* — Patterson & Sheridan, LLP

(57) ABSTRACT

Wireless local area networks (WLANs) provide wireless communication between various wireless devices. Frames are acknowledged (ACKed) after a short and predefined MAC idle time. The MAC idle time varies with 1) the physical distance between wireless devices, caused by the delay of wireless signal propagation, and 2) the time to detect the ACK at the local wireless device, which varies with the signal strength of the incoming ACK. Embodiments present CAE-SAR (CArriEr Sense-bAsed Ranging), which combines time of flight (TOF) and signal-to-noise ratio (SNR) measurements to calculate the distance between two wireless devices. CAESAR measures the distance by estimating the MAC idle time in a data/ACK communication at a particular clock resolution and the ACK detection time on a per-frame basis. Performance measurements confirm the accuracy of the solution and show the capability to track the distance to WLAN smart phones at pedestrian speeds.

24 Claims, 10 Drawing Sheets

(51) Int. Cl.

| | | |
|---|---|---|
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| G01S 5/02 | (2010.01) | |
| H04W 64/00 | (2009.01) | |
| G01S 5/14 | (2006.01) | |
| G01S 13/87 | (2006.01) | |
| H04L 1/16 | (2006.01) | |

(56) References Cited

U.S. PATENT DOCUMENTS

| | | | | |
|---|---|---|---|---|
| 6,876,326 | B2 * | 4/2005 | Martorana | 342/463 |
| 7,245,893 | B1 | 7/2007 | Husted et al. | |
| 7,710,321 | B2 * | 5/2010 | Heidari-Bateni et al. | 342/458 |
| 2002/0118723 | A1 * | 8/2002 | McCrady et al. | 375/130 |
| 2006/0222118 | A1 | 10/2006 | Murthy et al. | |
| 2010/0046388 | A1 * | 2/2010 | Kim et al. | 370/252 |
| 2010/0135178 | A1 * | 6/2010 | Aggarwal et al. | 370/252 |
| 2010/0183063 | A1 * | 7/2010 | Fukagawa et al. | 375/224 |

OTHER PUBLICATIONS

Gunther et al., Measuring Round Trip Times to Determine the Distance Between WLAN Nodes, 2005, Springer Berlin Heidelberg, Networking 2005, ISBN 978-3-540-25809-4, pp. 768-779.*

Horie et al., Novel CSMA Scheme for DS-UWB Ad-hoc Network with Variable Spreading Factor, Conference on Ultrawideband Systems and Technologies. Joint UWBST & IWUWBS, 2004.*

Lu et al., Performance of a burst-frame-based CSMA/CA protocol: Analysis and Enhancement, Jan. 2009, Wireless Networks, vol. 15, Issue 1, pp. 87-98.*

Aug. et al.,An Efficient Multi-User UWB Receiver for Distributed Medium Access in Ad Hoc and Sensor Networks, Sep. 19-22, 2004, Radio and Wireless Conference, IEEE.*

Want, Roy et al., The Active Badge Location System, TOIS—ACM Transactions on Information Systems, vol. 10, No. 1, pp. 91-102, 1992, ACM, New York, United States.

Philipose, Matthai et al., Mapping and Localization with RFID Technology, IEEE International Conference on Robotics and Automation, Dec. 2003, Intel Corporation, Santa Clara, United States.

Priyantha, Nissanka B. et al., The Cricket Location-Support System, 6th ACM International Conference on Mobile Computing and Networking (ACM MOBICOM), Aug. 2000, ACM, New York, United States.

Gezici, Sinan, et al., Localization via Ultra-Wideband Radios, IEEE Signal Processing Magazine, Jul. 2005, pp. 70-84, IEEE, Piscataway, United States.

Skyhook, Skyhook Wireless Inc., 2015, <http://www.skyhookwireless.com/>.

Chu, Mike, New magical blue circle on your map, Google Mobile Blog: News and notes from the Google Mobile team, Nov. 28, 2007, <http://googlemobile.blogspot.com/2007/11/new-magical-blue-circle-on-your-map.html>.

Navizon: Accurate Positioning Anywhere, 2014, <http://www.navizon.com/>.

Apple Inc., iOS 4: Understanding Location Services, 2014, <http://support.apple.com/en-us/HT201674>.

Gunther, Andre et al., Measuring Round Trip Times to Determine the Distance between Wlan Nodes, Proceedings of the 4th IFIP-TC6 international conference on Networking Technologies, Services, and Protocols; Performance of Computer and Communication Networks; Mobile and Wireless Communication Systems, 2005, pp. 1-12, Springer-Verlag, Berlin, Germany.

Ciurana, M. et al A ranging system with IEEE 802.11 data frames, in Proc. IEEE RWS'07, pp. 133-136 IEEE, Piscataway, United States.

About ath9k, Linux Wireless, <http://wireless.kernel.orgien/users/Drivers/ath9k>.

McCrady, Dennis D. et al., Mobile Ranging Using Low-Accuracy Clocks, IEEE Transactions on Microwave Theory and Techniques, vol. 48, No. 6, Jun. 2000, pp. 951-957, IEEE, Piscataway, United States.

IEEE Standard for Information Technology—Telecommunications and information exchange between systems—Local and metropolitan area networks—Specific requirements: Part 11: Wireless LAN Medium Access Control (MAC) and Physical Layer (PHY) Specifications, Mar. 8, 2007, IEEE, Piscataway, New Jersey.

Tinnirello, Ilenia et al., On the side-effects of propietary solutions for fading and interference mitigation in IEEE 802.11b/g outdorr links, Computer Networks 53, 2009, pp. 141-152, Elsevier B.V., Amsterdam, The Netherlands.

Practical Manufacturing Testing of 802.11 OFDM Wireless Devices: Handbook, LITEPOINT, Aug. 2010, pp. 1-40, LitePoint Corporation, Sunnyvale, United States.

Heiskala, J. et al., Chapter 2. Synchronization, Section: Timing Estimation, subsection: Packet Detection, pp. 53-60, OFDM Wireless LANs: A Theoretical and Practical Guide, 2001, Sams Publishing, Carmel, United States.

Gummadi, Ramakrishna, et al., Undestanding and Mitigating the Impact of RF Interference on 802.11 Networks, pp. 1-14, Proceedings of the 2007 conference on Applications, technologies, architectures, and protocols for computer communications, 2007, ACM, New York, United States.

Acharya, Prashanth Aravinda Kumar et al., Congestion-Aware Rate Adaption in Wireless Networks: A Measurement-Driven Approach, 2008, pp. 1-9, IEEE, Piscataway, New Jersey.

Ciurana, Marc et al., Performance stability of software ToA-based ranging in WLAN, 2010 International Conference on Indoor Positioning and Indoor Navigation (IPIN), Sep. 2010, pp. 1-8, IEEE, Piscataway, United States.

Ciurana, Marc et al., SofTOA: Software Ranging for TOA-Based Positioning of Wlan Terminals, 2009, pp. 207-221, Springer-Verlag, Berlin, Germany.

soekris engineering, inc., pp. 1-2, 2014, <http://soekris.com/>.

Grunenberger, Yan et al., Experience with an Implementation of the Idle Sense Wireless Access Method, Proceedings of the 2007 ACM CoNEXT conference, Article 24, 2007, ACM, New York, United States.

Giustiniano, Domenico et al., Demo: Distance Tracking using WLAN Time of Flight, 2011, ACM, New York, United States.

Liu, Hui, Survey of Wireless Indoor Positioning Techniques and Systems, IEEE Transactions on Systems, Man, and Cybernetics-Part C: Applications and Reviews, vol. 37, No. 6, pp. 1067-1080, IEEE, Piscataway, United States.

Han, Dongsu, et al., Access Point Localization Using Local Signal Strength Gradient, Lecture Notes in Computer Science, 2009, pp. 91-100, Springer-Verlag, Berlin, Germany.

Youssef, Moustafa et al., PinPoint: An Asynchronous Time-Based Location Determination System, Proceedings of the 4th international conference on Mobile systems, applications and services, Jun. 19, 2006, pp. 165-176, ACM, New York, United States.

Hoene, Christian et al., Four-way Toa and Software-Based Trilateration of IEEE 802.11 Devices, IEEE 19th International Symposium on Personal, Indoor and Mobile Radio Communications, Sep. 2008, IEEE, Piscataway, United States.

Golden, Stuart A. et al., Sensor Measurements for Wi-Fi Location with Emphasis on Time-of-Arrival Ranging, IEEE Transactions on Mobile Computing, vol. 6, No. 10, Oct. 2007, pp. 1185-1198, IEEE, Piscataway, United States.

Konig, S., et al., Precise time of flight measurements in IEEE 802.11 networks by cross-correlating the sampled signal with a continuous Barker code, 2010 IEEE 7th International Conference on Mobile Adhoc and Sensor Systems, Nov. 2010, IEEE, Piscataway, United States.

(56) References Cited

OTHER PUBLICATIONS

Chintalapudi, Krishna, et al., Indoor Localization Without the Pain, Microsoft Research, Sep. 2010, ACM, New York, United States.
Bahl, Paramvir et al., Radar: An In-Building RF-based User Location and Tracking System, Proceedings of Nineteenth Annual Joint Conference of the IEEE Computer and Communications Societies, 2000, IEEE, Piscataway, United States.
Ji, Yiming et al., Ariadne: a dynamic indoor signal map construction and localization system, Proceedings of the 4th international conference on Mobile systems, applications and services, 2006, Acm, New York, United States.
Haeberlen, Andreas et al, Practical robust localization over large-scale 802.11 wireless networks, Proceedings of the 10th Annual International Conference on Mobile Computing and Networking, 2004, ACM, New York, United States.
Bulusu, Nirupama et al., GPS-less Low Cost Outdoor Localization for; Very Small Devices, Personal Communications, vol. 7, Issue 5, pp. 1-7, IEEE, Piscataway, United States.
Youssef, Moustafa et al., The Horus WLAN Location Determination System, Proceedings of the 3rd international conference on Mobile systems, applications, and services, 2005, ACM, New York, United States.
Lim, Hyuk et al., Zero-Configuration, Robust Indoor Localization: Theory and Experimentation, 25th IEEE International Conference on Computer Communications, Apr. 2006, IEEE, Piscataway, United States.

* cited by examiner

CARRIER SENSE-BASED RANGING

CROSS-REFERENCE TO RELATED APPLICATIONS

This application claims priority benefit to United States provisional patent application titled, "MOBILE DEVICE DISTANCE MEASUREMENT," filed on Apr. 25, 2011, having application Ser. No. 61/478,793, and is incorporated by reference herein.

BACKGROUND

1. Field of the Invention

Embodiments relate to wireless local area networks (WLANs) and, in particular, to a system and method for calculating the distance between two wireless devices communicating over a WLAN.

2. Description of the Related Art

Global Positioning System (GPS) technology—or other forms of radio resource measurement (RRM) technology—can be used to calculate an accurate geographical location of a mobile device. In some cases, however, the area in which the mobile device is located can cause these technologies to produce inaccurate results. This occurs, for example, in areas where signals from GPS satellites are blocked or overly attenuated, such as in downtown city centers with large buildings, mountainous regions, and indoor environments. In such areas, RRM-based measurements suffer from the same inaccuracies as the GPS-based measurements. Additionally, consumer-grade GPS-enabled devices (e.g., smart phones) may exhibit low-accuracy location calculations even in open areas where accurate results are expected to be obtained, since the GPS receivers in such devices have lower sensitivity than high-quality state-of-the-art GPS receivers included in, for example, professional and military grade mobile devices.

One useful metric pertaining to wireless device location calculations involves determining a distance between two wireless devices, such as an access point and a mobile device communicating therewith. The majority of existing techniques directed toward distance measurement between two devices are based on received signal power. However, received signal power is a non-linear function of the distance between the wireless devices, and is both time-variant and highly dependent on the environment in which the wireless devices are communicating. This produces inaccurate distance calculations. Moreover, in implementations that attempt to calculate distance based on received signal power, routine calibration of the environment is required to be performed periodically, which increases overhead and complexity.

Another technique for distance measurement between two wireless devices employs round-trip-time (RTT)-based measurements that attempt to estimate the time occurring between the transmission of data and the subsequent reception of an acknowledgement signal (ACK). Since RTT is a linear function of the distance of the transmission, RTT-based distance measurements can outperform the accuracy of distances that are calculated according to received signal power. However, most RTT-based distance measurements are calculated from the beginning of the data transmission until the entire ACK signal is received. In particular, the distance measurement is based on a premise that hardware (HW) interrupts trigger at both the start time of the data transmission and at the time the media access control layer (MAC) ACK is completely decoded. One problem with this approach is that HW interrupts are handled by a mobile device's underlying operating system (OS) and, as a result, are not always precisely timed, which causes the HW interrupts to vary significantly based on the number of interrupts scheduled and the overall central processing unit (CPU) workload. Consequently, high jitter signals can be introduced in the distance measurements, which may increase when, for example, other processes consume CPU resources or when a power saving mode of the CPU is activated.

As the foregoing illustrates, there is a need in the art for an improved technique for calculating a distance between two wireless devices communicating over a WLAN.

SUMMARY

One embodiment of the invention provides a method of estimating a distance to an electronic device communicating over a wireless network. The method includes sending a first message to the electronic device, receiving a second message in response to the first message, determining, based on the first message and the second message, a transmission idle time, determining an expected interval associated with the wireless network, calculating a frame detection time based on both a signal-to-noise ratio of the second message and the transmission idle time, and estimating a distance to the electronic device based on the transmission idle time, the expected interval and the frame detection time.

Further embodiments of the present invention include, without limitation, a system and a non-transitory computer-readable storage medium that includes instructions that enable a processing unit to implement one or more aspects of the above methods.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
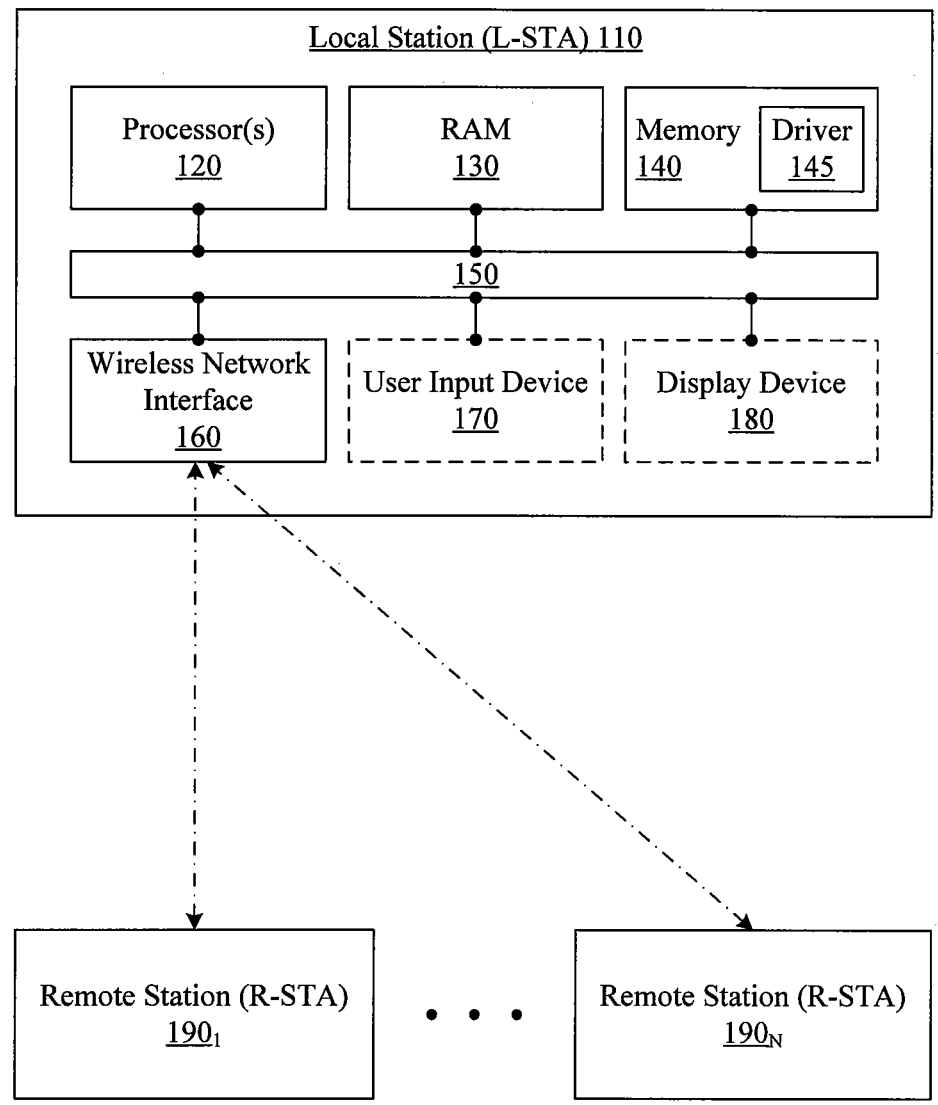
FIG. 1 is a block diagram of a system in which one or more embodiments can be practiced.

Embodiments disclosed herein set forth a WLAN ranging technique based on time-of-flight (TOF) and signal-to-noise-ratio (SNR) measurements to estimate the distance between two WLAN devices, e.g., a wireless access point and a mobile phone. The WLAN ranging technique is referred to herein as "CAESAR" (CArriEr Sense-bAsed Ranging), because it takes advantage of the native WLAN carrier-sense.

As is described in detail herein, CAESAR implements a WLAN TOF echo technique (i.e., the round-trip time of a signal transmitted to a remote device) that minimizes errors caused by noise, such as clock-drift. In one embodiment, the echo technique is based on a Media Access Control (MAC) idle time and a Short Interframe Space (SIFS) time between the data and the subsequent acknowledgement (ACK). This MAC idle time is the shortest 802.11 MAC timing that is available under the 802.11 standards, and it is used to reserve a communication channel. The duration of the MAC idle time is predefined and expected to be constant. However, the MAC idle time in a data/ACK communication varies with the physical distance between the two wireless devices due to the natural delay of wireless signal propagation. As is described in further detail herein, CAESAR exploits the variation and the short duration of the MAC idle time for ranging measurements.

According to various embodiments, CAESAR measures the MAC idle time using carrier-sense samples at the resolution of a WLAN clock, which, for example, is 44 MHz in 802.11b/g implementations. As is described in further detail below, various tests show that the clock frequency results in a distance estimated with a quantization error of 3 meters, and the clock frequency also minimizes the noise due to interactions with system tasks. The MAC idle time varies not only due to the signal propagation time but also as a function of the time to detect the ACK, which is influenced by the SNR of the ACK. Accordingly, CAESAR uses SNR measurements to characterize the dispersion generated by the ACK detection time, which increases distance measurement accuracy. CAESAR does not require, but might gain, from calibration in links that exhibit multipath components. An example of such calibration is described in further detail below.

Embodiments presented herein provide a low-cost and widely deployed ranging solution that does not require any hardware changes, but instead uses what is needed for correct operation of the 802.11 protocol. To accomplish a hardware-independent technique, in one embodiment, the reconfigurability of the open-source driver of the Atheros WLAN chipsets is exploited in order to implement CAESAR on commodity hardware, which, in turn, presents a new method for accessing the carrier-sense information provided by popular chipsets.

As described above, embodiments set forth a design and implementation of an 802.11 WLAN ranging technique. A local wireless device station (L-STA) uses ranging to calculate the distance d to remote wireless device stations (R-STAs) in the coverage area of the L-STA. In particular, embodiments are directed to a precise and real-time 802.11 WLAN ranging technique that exploits only the 802.11 MAC protocol and does not require a new physical layer (PHY) nor low-level PHY processing. Embodiments are also directed toward satisfying a plurality of requirements, which are set forth below.

One requirement is high-precision, where the L-STA executes a fine-grained geolocation algorithm (i.e., CAESAR) that accurately calculates ranging to one or more R-STAs. Another requirement is fast convergence, i.e., the geolocation tracking algorithm provides real-time distance estimation. Another requirement is that no changes to the 802.11 protocol are made, which increases cost-effectiveness. Another requirement is that embodiments are implementable on commodity hardware so as to ease the adoption of the ranging technique for research and commercial use. Another requirement is low network usage, since the primary goal of a WLAN network is network communication, and, therefore, wireless devices should not be affected by the geolocation algorithm. Another requirement is workload independence—the geolocation algorithm should operate independent of the L-STA and WLAN network workload. Yet another requirement is minimal calibration—the geolocation algorithm should be immediately ready to be used by geolocation services.

Accordingly, embodiments set forth an 802.11 WLAN ranging technique that targets the above requirements by combining a TOF echo technique with SNR measurements, the details of which are described in the following paragraphs.

FIG. 1 is a block diagram of a system 100 that includes an L-STA 110 and one or more R-STAs 190 in communication therewith, where L-STA 110 is configured to implement CAESAR. It will be readily apparent to one of ordinary skill in the art that many other hardware and software configurations are suitable for use with the invention. For example, the L-STA 110 may be a desktop computer, a laptop computer, a mobile device, a wireless access point (such as a router), and the like. As shown, the L-STA 110 includes processors 120. In some cases, the processors are configured to execute an operating system (OS) such as Windows® from Microsoft Corporation, Solaris from Sun Microsystems, LINUX®, UNIX, and the like. In still other embodiments, the techniques described herein may be implemented using a chip or an auxiliary processing board. Various embodiments may be based upon systems provided by daVinci, Pandora, Silicon Color, or other vendors.

As shown, L-STA 110 includes computer components such as a processor 120, memory storage devices, such as a random access memory (RAM) 130 and memory 140, and a system bus 150 interconnecting the above components and additional components, such as a wireless network interface 160, an optional user input device 170 and a display device 180. As shown, memory 140 stores driver 145, which is executed by processor(s) 120 and manages the wireless network interface 160.

In one embodiment, L-STA 110 includes optional user input device 170 and optional display device 180, such as a keyboard and an LCD screen, respectively, when L-STA 110 is, for example, a smart phone. In various embodiments, display device 180 may be used to display user interfaces and rendered images that are associated with CAESAR. As also shown, L-STA 110 includes a wireless network interface 160, which includes a transmitter and a receiver to allow the L-STA 110 to be communicatively coupled to one or more R-STAs 190 via, for example, an ad-hoc 802.11-based wireless network. In some embodiments, the wireless network interface 160 is integrated on a motherboard included in L-STA 110. Though not explicitly illustrated in FIG. 1, R-STAs 190 are configured to include at least a wireless network interface 160 so that the R-STAs 190 are capable of communicating with L-STA 110 in order to measure distances between the L-STA 110 and the R-STAs 190.

MAC Idle Time

Due to a typical lack of clock synchronization, WLAN TOF ranging techniques are conventionally based on echo techniques, where an L-STA 110 measures the round trip time of a signal transmitted to an R-STA 190. Unfortunately, WLAN echo techniques are affected by noise in the measurement, which can be caused by clock drift, interaction with system tasks, and protocol overhead (due to the estimation of the remote processing time). This noise causes low precision, low convergence, and low tracking capability of the estimated distance.

To address these problems, embodiments set forth a TOF measurement technique based on the MAC idle time between the MAC data frame and the subsequent MAC ACK frame. Busy and idle channel states are used to sense the presence (busy channel) or absence (idle channel) of a frame according to the 802.11 Carrier Sense Multiple Access/Collision Avoidance (CSMA/CA) protocol. The channel is idle for a short time between the data and ACK communication when no other transmissions are permitted. This time is the shortest 802.11 MAC idle time, which is exploited by embodiments to execute distance measurements.

As part of the 802.11 CSMA/CA protocol, the L-STA 110 transmits a data frame and expects to receive an ACK from R-STA 190, which is used to signal a successful reception of the frame. This notion is illustrated in diagram 200 of FIG. 2. The MAC idle time at the R-STA 190 is denoted Short Interframe Space (SIFS), and is fixed by the 802.11 standard, e.g., $t_{SIFS}=10$ µs in 802.11b/g. The MAC idle time at the L-STA 110, denoted as $t_{MACidle}$, varies with both the propagation time of the data $t_{p,data}$ from the L-STA 110 to the R-STA 190 and the ACK $t_{p,ACK}$ from the R-STA 190 to the L-STA 110. For a speed of light of c=300 m/µs, a value of less than $t_{MACidle}=12$ µs is expected for typical coverage ranges. $t_{MACidle}$ is measured using the main WLAN clock, which, as described above, typically operates at 44 MHz. Since the signal travels from L-STA 110 to R-STA 190 and back, the distance resolution for the single sample (i.e., a data/ACK exchange) is 300/(2·44)=3.4 m.

Clock Drift and Interaction with System Tasks

Due to tolerances, there is a relative clock drift between L-STA 110 and R-STA 190. This clock drift causes significant measurement errors when using conventional echo techniques. However, the impact of drift is negligible when using an echo technique based on $t_{MACidle}$, as is described in further detail herein. As set forth above, $t_{MACidle}$ is measured over a short period of time and uses the main 44 MHz WLAN clock. For example, a drift of 25 ppm between the L-STA 110 and an R-STA 190 clock results in a drift of 25 s in a million seconds, or 0.13% of one WLAN cycle in 12 µs. Measuring $t_{MACidle}$ with the main WLAN clock also minimizes the interaction with the system tasks, because the WLAN clock operations are mostly not influenced by the tasks of the main CPU.

Channel State in a Data/ACK Exchange

Figure 2:
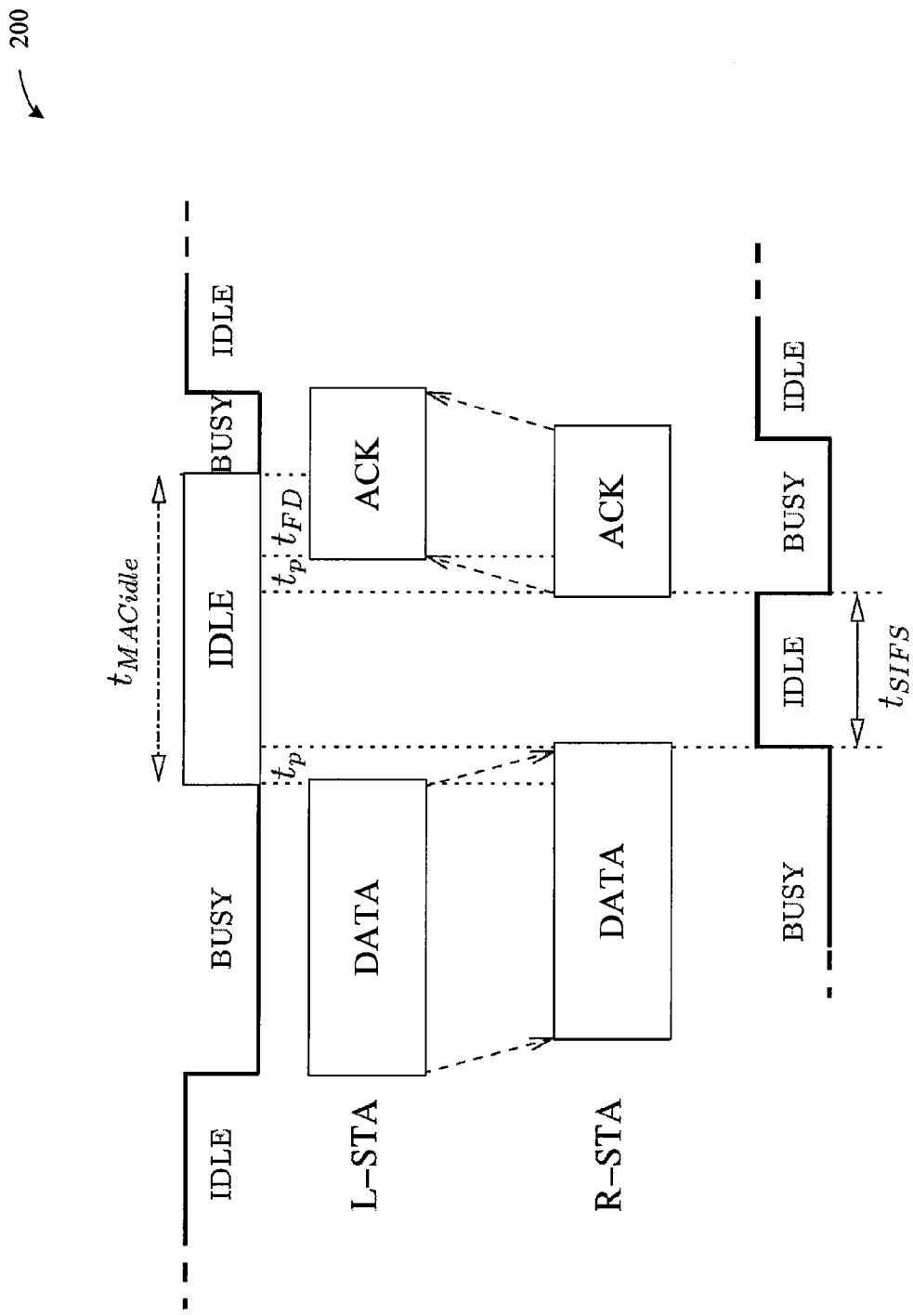
FIG. 2 is a diagram illustrating details of a transmission of a data frame and a receipt of an acknowledgement (ACK) frame, according to one embodiment.

In order to determine the parameters that affect $t_{MACidle}$, the factors that affect the busy-to-idle and idle-to-busy transitions should be considered, which also are represented in diagram 200 of FIG. 2. Correct identification of frame boundaries, i.e., the start and the end of a new frame, is one of the most critical operations in WLAN networks.

L-STA 110 Locally Estimates the ACK Detection Time $t_{MACidle}$ starts with the busy-to-idle transition at the end of the data transmission and ends with the idle-to-busy transition at the start of the ACK reception, which also is illustrated in diagram 200 of FIG. 2. While the busy-to-idle transition at the end of the data transmission is readily determined by the end-of-frame transmission, the start of the ACK reception requires more discussion. The default operation of an 802.11 WLAN devices is reception, such that it continuously senses the medium via the Clear Channel Assessment (CCA) module and reports the busy and idle channel state at the WLAN clock resolution. The CCA declares the medium as busy when it detects an 802.11-modulated signal (frame detection, FD). This operation causes a delay at the L-STA 110 from the start of the 802.11 preamble to the idle-to-busy transition, which is referred to herein as the frame detection time $t_{FD}$.

Not Estimating the Remote Processing Time

Most of the $t_{MACidle}$ time experienced at the R-STA 190 is the result of the $t_{SIFS}$. The start and end of the SIFS are determined by PHY operations at the resolution of the main WLAN clock. In particular, the SIFS starts when the signal strength of the data at R-STA 190 drops below a coarse low threshold at the end of the frame. Also, R-STA 190 starts to transmit the ACK when the SIFS expires. Moreover, the turn-around time from reception to transmission of the start of the ACK—which is known and constant—occurs during the SIFS. This results in a stable $t_{SIFS}$, and, as a result, embodiments do depend on additional message passing per-remote wireless device to in order determine remote processing times per-frame.

Carrier Sense-Based Ranging $t_{MACidle}$ is calculated according to Equation 1:

$$t_{MACidle}=t_{p,data}+t_{SIFS}+t_{p,ACK}+t_{FD} \quad \text{(Equation 1)}$$

A similar radio-channel is assumed for the propagation of the data and the ACK, so $t_p=t_{p,data}=t_{p,ACK}$, and the distance $\hat{d}$ at L-STA 110 is estimated according to Equation 2:

$$\hat{d}=c \cdot (t_{MACidle}-t_{SIFS}-t_{FD})/2 \quad \text{(Equation 2)}$$

Thus, CAESAR only needs local information, such as the $t_{FD}$, $t_{MACidle}$, and the SNR, and does not require any information from the R-STA 190. The following describes an estimator to characterize the dispersion in the measurements due to $t_{FD}$, where the estimator increases distance measurement accuracy by filtering a limited set of samples. The following also describes how increased software programmability in off-the-shelf wireless devices allows $t_{MACidle}$ to be estimated at the driver 145 level, which is non-trivial since $t_{MACidle}$ occurs in a short period of time during a data/ACK communication.

Frame Detection Time

Figure 3:
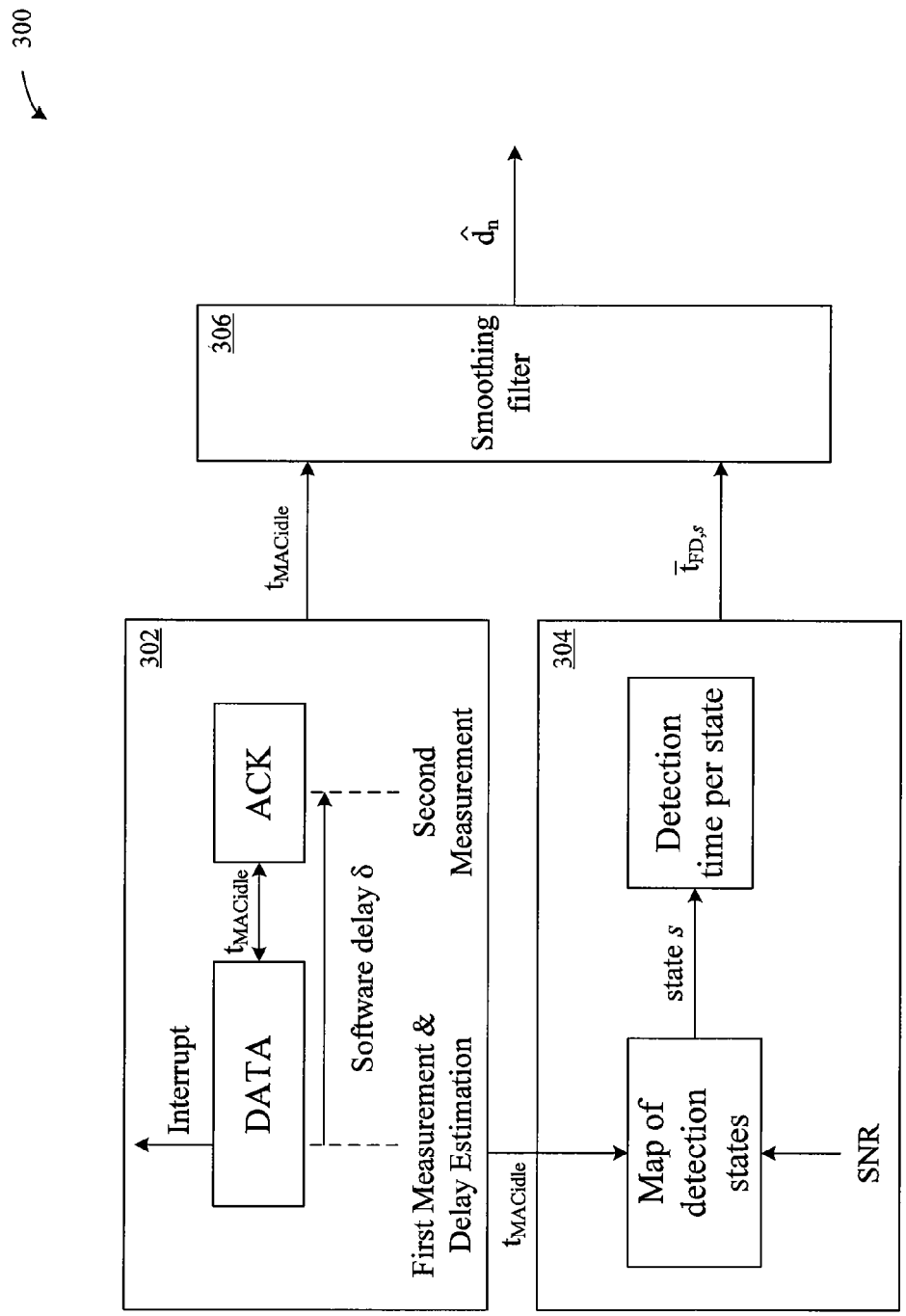
FIG. 3 is a conceptual diagram illustrating the estimation of both Media Access Layer (MAC) idle time and frame detection (FD) time, followed by a smoothing thereof, according to one embodiment.

As described above, in one embodiment, CAESAR is implemented on commodity Atheros chipsets using the "Ath9k" driver 145. FIG. 3 illustrates a diagram 300, and box 302 included therein illustrates the estimation of $t_{MACidle}$, where L-STA 110 sends an 802.11 data and measures $t_{MACidle}$ by extracting and processing 44 MHz hardware timing counters. Block 304 illustrates the estimation of $t_{FD}$, where L-STA 110 uses the pair ($t_{MACidle}$, SNR) to infer $t_{FD}$. Finally, $t_{MACidle}$ and $t_{FD}$ samples are smoothed at box 306 in order to determine the distance between L-STA 110 and R-STA 190, the details of which are described below.

Correlating Detection Time and SNR

Figure 4:
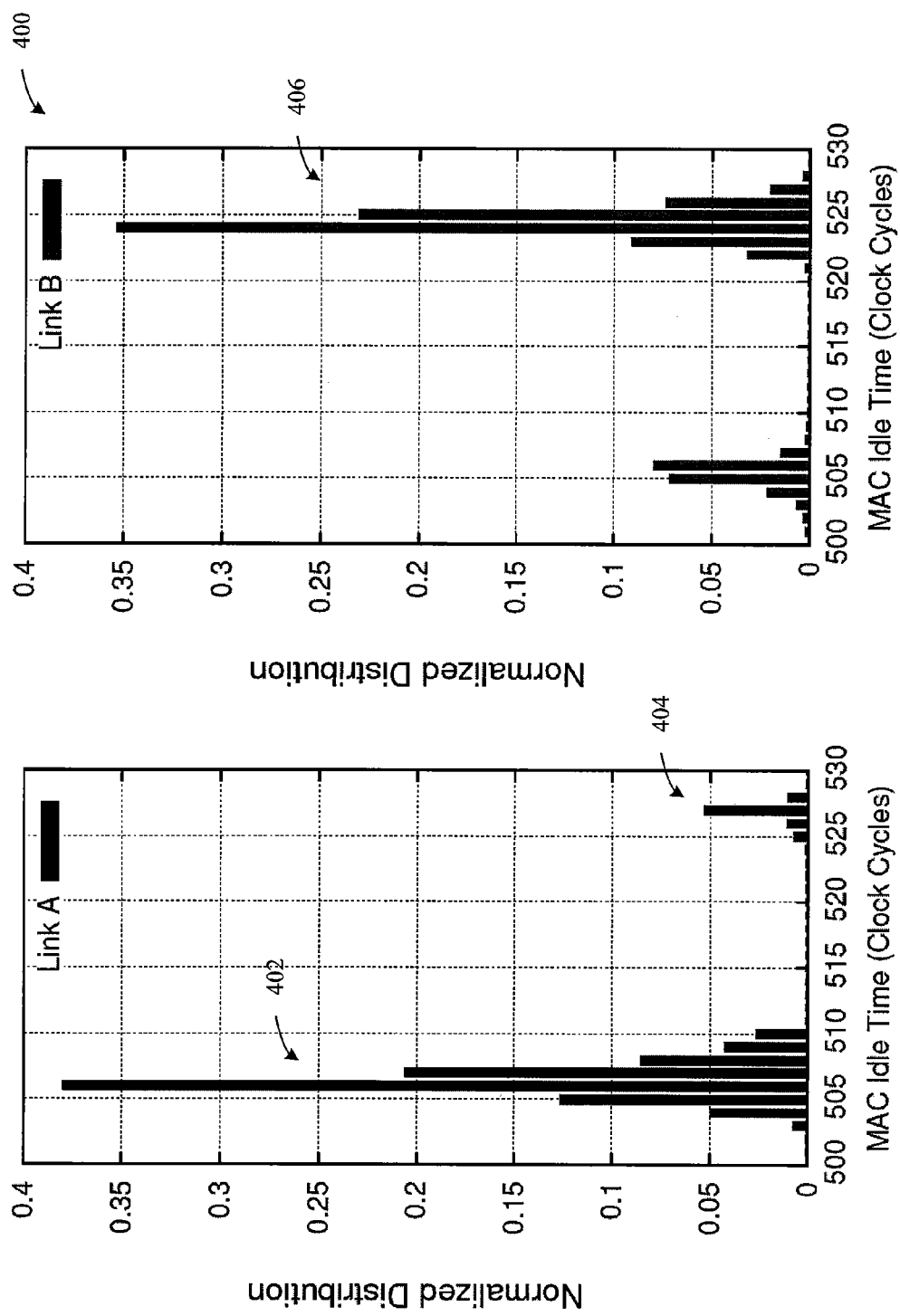
FIG. 4 illustrates test results gathered between two indoor links, where the test was conducted according to embodiments described herein.

The IEEE 802.11 standard mandates that at least 90% of $\{t_{FD}\}$ samples are within an observation time window of 4 μs from the start of the preamble. Although the frame detection implementation is manufacturer-dependent, it always occurs during the 802.11 preamble and correlates the received sequence samples with one or more delayed copies of the sequence, where the delay is equivalent to the length of one symbol. Graphs 400 of FIG. 4 illustrate results of a test with two indoor links, denoted as link A and link B, and highlight the variability of $t_{FD}$. In each test, an L-STA 110 sent constant ping traffic for several hours to an R-STA 190 that was closer than 15 m. The link distance was fixed, but a high variability of ACK SNR (up to 15 dB) was typically observed.

As shown in graphs 400, $t_{MACidle}$ correspondingly increases with $t_{p,data}$ and $t_{p,ACK}$, but a distance of less than 15 m results in a delay of less than (15 m/3.4)/44=0.1 μs. The observed $t_{MACidle}$ in graphs 400 of FIG. 4 is in the range of 500-530 clock cycles, i.e., ≈11.3-12 μs, which is higher than $t_{SIFS}$+0.1=10.1 μs. The resulting difference is due to the $t_{FD}$ expressed in Equation 1.

Additionally, graphs 400 of FIG. 4 illustrate a bimodal distribution of $t_{MACidle}$ with two main spikes for each link. Link A presents a first spike centered at ≈506-507 clock cycles and a second spike centered at ≈527 clock cycles. A similar distribution is found in link B. The difference between the two spikes of ≈20 clock cycles of $t_{MACidle}$ would cause an unacceptable uncertainty in distance estimation. For example, referring to Equation 2, twenty cycles correspond to a difference in the distance estimate of 3.4 m·20=68 m.

This finding is evidenced by link A, since the samples of the second spike 404 are, on average, received at a lower ACK SNR compared with the ones of the first spike 402. In contrast, in link B, the second spike 406 is associated with frames at a higher SNR compared with those of the first spike. Since $t_{MACidle}$ in Equation 1 is a function of $t_{FD}$, and since $t_{SIFS}$ is expected to be constant, it is inferred that $t_{FD}$ is a function of the ACK SNR, i.e., $t_{FD}$=ƒ(SNR). In particular, the frame detection requires that the ACK preamble is detected and that the dynamic range of the signal is a desired one (according to Automatic Gain Control (AGC)). The operation for optimizing the dynamic range per frame is a function of the SNR, which causes the spikes illustrated in graphs 400 of FIG. 4, and L-STA 110 indicates that the medium is busy at the MAC layer only after the signal gain is adjusted. This method helps to minimize the incidence of false frame detections and of undetected frames, which otherwise would reduce MAC throughput. The following discusses how the AGC impacts $t_{FD}$.

Impact of Gain Control

WLAN receivers decode frames over a large range of signal strengths, which may vary from 0 to 70 dB above typical background noise levels. In each WLAN chipset (and independently of the manufacturer), these signals are internally normalized into a fixed range. An incoming signal r can be immediately decoded when the incoming signal r is in a preferred range (PR). Conversely, when r is out of the PR range, the gain control of the AGC has to be tuned so that the incoming signal r falls in the desired range. For cost and complexity reasons, the AGC can be performed according to two detection methods that are concurrently performed, which are described below.

A strong signal detection (SSD) occurs when r is received at a high strength that exceeds a certain threshold (denoted as coarse high threshold). Upon detection of this condition, the circuit places the RF front-end in a low gain mode and decreases amplifier gain to avoid analog to digital (ADC) saturation. For example, in PRISM, Intel and Atheros chipsets, the AGC subtracts a coarse 30 dB gain from a strong signal r. This AGC gain is kept constant during the entire frame reception. Once the reception is completed, the AGC block reacts to this event by increasing the amplifier gain to the default value.

If the signal strength of r is too low, the quantization noise of the ADC converter may render the SNR too low for correct detection. Here, a weak signal detection (WSD) may be needed to adjust the signal in the preferred range. This process uses statistical analysis based on the correlation of the received 802.11 preamble.

A higher $t_{FD}$ is expected (and, according to Equation 2, a higher $t_{MACidle}$ at a given distance) when the AGC adjusts the dynamic range of r for SSD and WSD frames. Next, detection state occurs. In particular, for an ACK frame, the AGC at L-STA 110 operates in one of the following detection state modes: SSD state—where signal r has high SNR and is detected via strong signal detection, PR state—where signal r is the preferred range, and WSD state—where signal r has low SNR and is detected via weak signal detection.

As an example, consider graphs 400 of FIG. 4. It is expected that the first spike 402 on link A corresponds to frames in the PR state since no gain control is necessary, while the second spike 404 is for the WSD state, because of the higher time needed to declare a medium busy and the low SNR of ACKs. A different distribution occurs on link B, where ACK frames are received at high SNR, and thus the second spike 406 is due to frames in SSD state.

Revealing the Detection State Per Frame

To determine the detection state for the set of $\{t_{MACidle}$, SNR$\}$, a variety of experiments were conducted, which involved placing two wireless devices in locations that differ in terms of distance, SNR, obstacles and 802.11g modulation. For each test, $t_{MACidle}$ and SNR samples were collected as the test results illustrated in graphs 400 of FIG. 4. The tests are valid for each 802.11g PHY rate and frame length since the 802.11g preamble is independent of these parameters. The following two techniques were then used to infer the state.

The first technique involves sampling the PR or the SSD/WSD state. In particular, $t_{MACidle}$ is used to distinguish between the two states. From FIG. 4, the standard deviation of the samples in one state (in the order of few cycles) is sufficiently smaller than the difference in cycles between the maximum values of adjacent states (of about 20 cycles). Thus, $t_{MACidle}$ samples in PR states do not overlap with the samples in SSD/WSD state.

The second technique involves sampling the SSD or the WSD state. In particular, the ACK SNR is used to distinguish between the two states. Samples in SSD or WSD state may lie in similar ranges of $t_{MACidle}$, but in a different range of ACK SNR. An upper bound of 600 cycles is added to limit the impact of the small number of outliers in the implementation and frames that are not ACKed due to low signal quality, collisions, and the like.

Table 1 sets forth various frame detection states and their corresponding samples. For example, if CAESAR measures a sample where $t_{MACidle}=530$ cycles and SNR=45 dB, then the sample is mapped to the SSD state.

TABLE 1

|  | $t_{MACidle}$ | SNR(dB) | $\bar{t}_{FD,s}$(cycles) |
|---|---|---|---|
| SSD State | 521-600 | 42-70 | 81.1 |
| PR State | 500-519 | 15-54 | 63.3 |
| WSD State | 521-600 | 0-28 | 84.0 |

In Table 1, the observed SNRs of the samples fall between 0 and 70 dB, and the SNR ranges for different detection states partially overlap. For example, frames with SNR between 15 and 28 dB could be received in either PR or WSD state. The signal amplitude above the noise is not the only factor that determines what AGC gain is used before the ADC conversion. The SNR is only a measurement of the average signal strength above the noise, and, therefore, does not give any information about the signal peak-to-average power ratio and the presence of interfering signals. As a result, a detection state cannot be unequivocally determined based on the SNR of the ACK, but SNR may be determined with the information about $t_{MACidle}$.

Detection State and Multipath

Once a sample n is mapped to a state, the distance $\hat{d}_{n,s}$ can be expressed according to Equation 3:

$$\hat{d}_{n,s}=c \cdot [(t_{MACidle}(s)-t_{SIFS}-\bar{t}_{FD,s}]/2 s \in S \quad \text{(Equation 3)}$$

In Equation 3, S is the set of detection states, $\bar{t}_{FD,s}$ is the average frame detection time for state s—which is dependent on the chipset manufacturer implementation—and $\gamma_s$ is the correction factor for multi-path effect. The following description sets forth how $\bar{t}_{FD,s}$ and $\gamma_s$ are derived, and, additionally, introduces $\sigma_s$, which is used to indicate the standard deviation of samples in state s.

Average Frame Detection Time

In one example, the set of $\{\bar{t}_{FD,s}\}$ is measured with L-STA 110 and R-STA 190 in line-of-sight (LOS) and known distance using AR9220 Atheros chipsets. For each detection state, ping traffic was sent and samples of $t_{MACidle}$ were collected. From Equation 2, $\bar{t}_{FD,s}$ was calculated, the results of which are summarized above in Table 1. An average detection time was then measured over 84 clock cycles, which produced $\bar{t}_{FD,s}=1.84$ μs for the WSD state. Thus, $\bar{t}_{FD,s}$ is within an observation time window of 4 μs, which is required by the IEEE 802.11 standard. Moreover, since the average value of the PR state can be approximated to the time of two orthogonal frequency-division multiplexing (OFDM) short symbols (equal to 0.8 μs·2=1.6 μs) of the 802.11 preamble, it can be concluded that the frame detection in 802.11g mainly works over the first two short symbols, while the AGC block requires an additional time of ≈0.4 μs.

The standard deviation (not shown in the Table 1) is also measured for the three states and find higher values for the SSD and the WSD state ($\sigma_s=0.83$ and 0.9 clock cycles, respectively) compared with the PR state (a fraction 0.45 of a clock cycle). This extra noise is likely added by the gain control in the AGC block.

Indoor Multipath Correction Factor

Since multipath introduces a positive bias in the $\{t_{MACidle}\}$ samples, distance is overestimated due to the extra distance traveled by the signal with respect to the direct path. Efficiently tackling the multipath relies on the ability to discriminate the direct path at lower signal strength (if any) with respect to the reflected paths. However, under multipath effect, a MAC-based solution like CAESAR that relies only on MAC busy and idle times synchronizes on the strongest (reflected) path. While this is an inherent limitation of not using advanced PHY processing, the side effects of the multipath can be alleviated assuming that the multipath causes a spreading of the $\{t_{MACidle}\}$ samples. In particular, some of the radio signals (e.g., the WLAN frames) arrive to a destination via the direct path, while others arrive via a reflected path.

Accordingly, embodiments implement a multipath threshold denoted $t_s$, such that the direct path is considered to be predominant in links where $\sigma_s<t_s$ and no correction factor is needed ($\gamma_s=0$), and, under multipath, a correction factor $\gamma_s=\sigma_s/2$ is subtracted for links where $\sigma_s \geq t_s$. This factor reduces the distance estimate of a sample that is assumed to be received via a reflected path.

Smoothing Filter

Dispersion of distance the measurements can be reduced by filtering multiple samples and exploiting the detection state of the frame. Indeed, samples in different states are subjected to independent sources of noise due to the preamble detection and the gain control adjustment. However, the noise components can be assumed Gaussian and can be filtered out via an Exponentially Weighted Moving Average (EWMA) filter according to Equation 4:

$$\bar{d}_n=(1-\alpha_s)\bar{d}_{n-1}+\alpha_s \hat{d}_{n,s} \text{ such that } \bar{d}_1=\bar{d}_{1,s} \quad \text{(Equation 4)}$$

In Equation 4, $\bar{d}_n$ is the current distance estimate, $\hat{d}_{n,s}$ is the last measured sample according to Equation 3 and detected in state s, and $\alpha_s$ is the filter weight.

Implementation

As described herein, CAESAR is entirely-implementable within L-STA 110. With Atheros chipsets, time-sensitive and chipset-dependent features are coded in the ath and ath9k modules, respectively, which implement low-level software functionality. In order to provide real-time estimation, a smoothing filter is implemented in the driver 145 of the chipset, which is illustrated as smoothing filter 306 in diagram 300 FIG. 3. In particular, the smoothing filter 306, in one embodiment, is implemented at the mac80211 layer (and thus at a higher level of the stack) with general-purpose code.

In order to avoid the introduction of new hardware modules, embodiments provide a technique for measuring $t_{MACidle}$ via software by accessing data that WLAN components are capable of providing to the driver 145, as described below.

Low-Level Measurements

In one embodiment, $t_{MACidle}$ is estimated by using the absolute time and the busy time measured by the CSMA/CA techniques described herein. In one example, 32-bit register counters maintained by Atheros WLAN chipsets are updated in hardware at the resolution of a clock tick. In particular, register counter R_RCCNT counts time at the 44 MHz resolution, and register counter AR_RCCNT counts the number of clock ticks where the transceiver is busy at the MAC layer (for transmission or reception).

In the following, I=(R_RCCNT−AR_RCCNT) which represents, in clock units, the time that L-STA 110 is idle. In accordance with FIG. 3, $t_{MACidle}$ can be estimated at the L-STA 110 by measuring I in two instants of time, i) when the 802.11 data is being transmitted and the channel is busy (i.e., the data transmission is ongoing), denoted as $I_1$, and ii) when the ACK is being transmitted and the channel is busy (i.e., the ACK reception is ongoing), denoted as $I_2$. This notion is represented by Equation 5:

$$t_{MACidle}=I_2-I_1 \text{[clock cycles]} \quad \text{(Equation 5)}$$

Equation 5 is particularly challenging to implement because, as shown in FIG. 2, the state of the channel is also idle before the data transmission and after the ACK reception. For example, if the second reading occurs after the ACK is received, $t_{MACidle}$ would be higher than expected, and the distance would be overestimated according to Equation 3. Further, $t_{MACidle}$ occurs in a very short time and the ACK duration is on the order of tens of μs. Accordingly, the following descriptions set forth how CAESAR implements fine-grained detection of the time of an ongoing data transmission and ongoing ACK reception.

Detecting an Ongoing Data Transmission

In one embodiment, a first reading is performed during the data transmission, which can be achieved using WLAN hardware interrupts. Note that the hardware interrupts cannot be used to directly and efficiently estimate the TOF in a data-ACK exchange. This is due to unpredictable delay between the time of an IEEE 802.11 hardware event and the driver 145 notification, caused by, for example, system tasks and/or operating in a power saving mode. However, the WLAN hardware interrupts can instead be used to inform the driver 145 that an event, e.g., a data transmission, started at some time in the past. For example, the Atheros baseband releases an interrupt ATH9K_INT_TX when the data starts to be transmitted. In particular, the interrupt ATH9K_INT_TX is released for two different events: when i) data begins to be transmitted, and ii) when an ACK is completely received. In order to distinguish between the two events, a status flag EINPROGRESS indicates whether ATH9K_INT_TX_TX is triggered by the first or the second event. The register counters are then read when the interrupt ATH9K_INT_TX with status flag EINPROGRESS is handled by the driver 145.

CAESAR measures $I_1$ when the interrupt is handled by the driver 145. Interrupts cannot be exploited for estimating when the ACK reception is ongoing. When the ACK reception is complete, another interrupt is triggered by the hardware and then handled by the driver 145 for upper-layer notification of the successful transmission. However, the delay occurring between the ACK completion and the interrupt handling is sensitive to the CPU usage. Measuring $I_2$ after this interrupt would erroneously add some (unpredictable) idle time after the busy-to-idle transition at the end of ACK reception and cause errors in the distance measurements. The following sets forth a technique to accurately measure $I_2$.

Detecting an Ongoing ACK Reception

CAESAR estimates a time δ from $I_1$ until ACK reception is ongoing and measures $I_2$ when the delay elapses. In detail, at the time of measuring $I_1$, CAESAR also reads the AR_TFCNT(1) register counter, which maintains the number of clock ticks during which the 802.11 transceiver transmits a frame. AR_TFCNT(1) can be reset after each transmission and then used to provide the exact time at L-STA 110 from the start of the transmission until the data transmission has been detected at the driver 145, the details of which are described below.

CAESAR uses the busy-waiting udelay (δ) function for scheduling a delay according to Equation 6:

$$\delta=t_{Data}-Cr \cdot AR\_TFCNT(1)+t_{SIFS}+t_{Preamble} \text{ [μs]} \quad \text{(Equation 6)}$$

In Equation 6, $t_{Data}$ is the data duration—which is a function of local PHY information such as the frame length and the rate—Cr is the WLAN clock rate in MHz (44 in 802.11b/g), and $t_{preamble}$ is the 802.11 preamble length. Since no other time-sensitive software tasks are executed in the WLAN driver 145 between $I_1$ and $I_2$ (but only hardware processing), this delay does not introduce any side-effects with respect to throughput. When the udelay function elapses, the ACK reception is ongoing and the driver 145 measures $I_2$ to estimate $t_{MACidle}$ according to Equation 5.

Evaluation of Low-Level Implementation

High accuracy of the values reported by the aforementioned registers is necessary to ensure that the readings occur during an ongoing data transmission and ACK reception. The following describes how this goal is accomplished by CAESAR. In one test scenario, two wireless devices were placed in proximity to one another and sent ping traffic of 500 bytes for 1000 seconds. Two network loads were considered: 1) one frame per second, which is an ideal condition because of low OS computational load, and 2) flooding ping traffic, which simulates high OS load.

First Reading

The accuracy of the first reading depends on the delay associated with the interrupt ATH9K_INT_TX. Again, embodiments rely on this interrupt being handled before the completion of the data transmission, which, as described above, is accomplished via usage of the AR_TFCNT (1) register counter. The value in AR_TFCNT(1) indicates the time passed from the start of data transmission to the time that the interrupt is handled by the driver 145, i.e., the interrupt delay. Thus, AR_TFCNT (1) indicates the set of minimum frame lengths and maximum transmission rates that can be used in CAESAR for ranging calculation.

Figure 5:
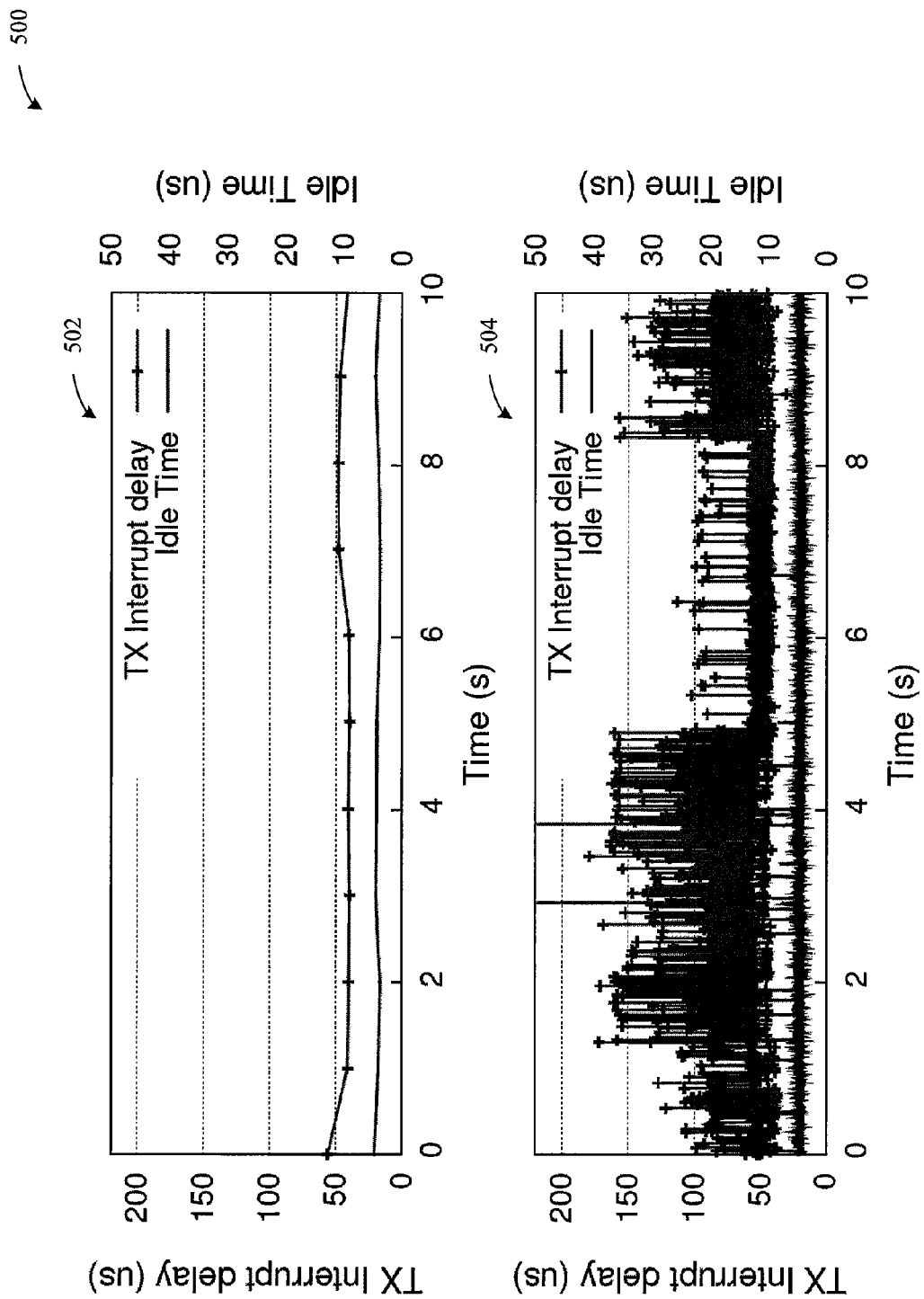
FIG. 5 illustrates test results for average interrupt delays that correspond to the test results of FIG. 4.

FIG. 5 plots results of an example test scenario as a function of time. As shown, an average interrupt delay of 42.23 μs was found for a low traffic rate, with a minimum delay of ≈35 μs, and 71.55 μs for the flooding rate, with standard deviations of 5.86 μs and 26.78 μs, respectively. These results confirm that the interrupt handler is less-predictable for a high system workload, at least for this test scenario. For flooding traffic and 99% of the frames, an interrupt delay of at most ≈150 μs occurred from the start of the data transmission until the interrupt was handled by the driver 145. As a result, only data traffic with transmission time greater than 150 μs can be reused for ranging calculation with no network overhead. Dedicated traffic should be sent instead when the 802.11 data traffic results in transmission times smaller than 150 μs.

Second Reading

The accuracy of the second reading may depend on two factors: 1) the reliability of the udelay function—which may be affected by other processes being executed by the CPU—and, 2) the delay in the driver 145 reading the registers. For evaluation, the delay δ is tuned to detect an ongoing SIFS at L-STA 110. Using δ as shown in Equation 6 would add the variation due to the propagation delay and the ACK detection time. Since embodiments aim to detect the event of an ongoing SIFS, an idle time constantly lower than 10·44=440 cycles is expected, where $t_{SIFS}$=10 µs. This method also allows for the standard deviation of the event that triggers the $I_2$ reading to be calculated.

Idle time samples are plotted in graphs 500 of FIG. 5 as a function of time, for both low traffic rate (graph 502) and flooding rate (graph 504). As shown, an average idle time of 4.17 µs was found for the low traffic rate and 4.68 µs is found for the flooding rate, with standard deviations of 0.31 µs and 0.75 µs, respectively. These results identify the high probability of the event detection and the small standard deviation compared with the duration of the 802.11g ACKs (≈tens of µs). Thus, embodiments enable the detection of an ongoing ACK reception by using δ as in Equation 6. Hence, the second reading can detect the ongoing ACK reception and retrieve the register counters R_RCCNT (2) and AR_RCCNT(2) during that time.

Average Frame Detection Time

The dependency of frame detection time versus the SNR is a general insight since SSD, PR and WSD states are needed in all 802.11 chipsets. However, the frame detection technique is proprietary and manufacturer-dependent. Thus, $\{\bar{t}_{FD,s}\}$ is calculated for different chipset brands, which is feasible since the calculation is needed only once per chipset brand.

SIFS Time

As described herein, the R-STA 190 should add a constant idle time. Some chipsets add a constant offset to the SIFS time since they have a constant positive offset of 49.9 cycles in comparison to Atheros chipsets, which results in a $t_{SIFS}$=10+49.9/44=11.3 µs. Thus, the constant offset is manufacturer-dependent, and may be detected by L-STA 110 based on the first bits of the ACK MAC address (that describe the chipset manufacturer) and a table of SIFS offset per manufacturer.

Evaluation

The following details results of various experiments conducting using CAESAR. Notably, average error of less than 1 m was obtained in 8 links out of 10. A lower accuracy is obtained in links with severe multipath obstruction. It is also shown that the error drops below 2 m after fewer than 25 samples in 9 links out of 10. It is also shown that CAESAR is stable across different frame rates at the L-STA 110. It is also shown that WLAN interference has limited impact on distances measured by CAESAR. It is further shown that CAESAR can track the distance to a WLAN smart phone at pedestrian speeds both outdoors and indoors.

Scenario and Deployment

Figure 6:
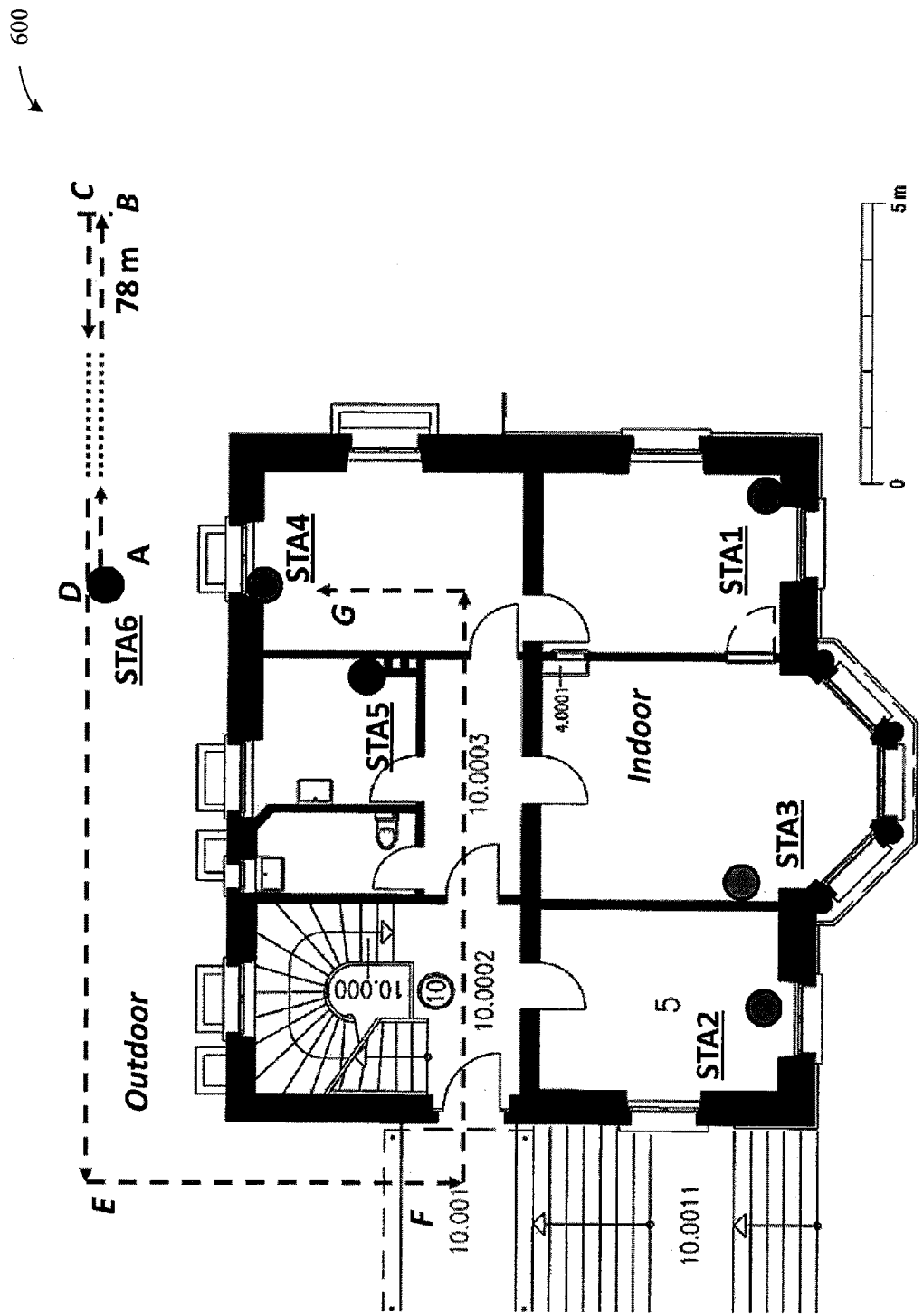
FIG. 6 illustrates a test bed that includes five wireless devices at fixed locations and a sixth wireless device with a variable location, where the test was conducted according to embodiments described herein.

According to the test bed 600 illustrated in FIG. 6, five wireless devices are at fixed locations, and at a relative distances according to Table 2 listed below. As shown in FIG. 6, there is no direct line of sight (LOS) between any wireless device pair. In the experiment represented by FIG. 6, the wireless devices STA1, STA2, STA3, STA4, and STA5 were embedded platforms based on Soekris net5501-70, and were configured to implement CAESAR. An AR9220 chipset from Atheros was used as the WLAN hardware interface and was configured to operate in 802.11g mode with auto-fallback rate activated. In the tests, the filter weight was $\alpha_s$=1/20, and the multi-path threshold was $t_s$=0.6 WLAN clock tick in PR state and $t_s$=1 WLAN clock tick in SSD and WSD state. The sixth wireless device (STA6) was a commercially available smart phone used to evaluate the tracking capability of CAESAR both indoors and outdoors.

TABLE 2

| Link | Expected | Distance Measured | Std | SNR |
| --- | --- | --- | --- | --- |
| 1-2 | 9 m | 8.05 m | 0.84 m | 38.7 dB |
| 1-3 | 7 m | 7.22 m | 0.60 m | 46.2 dB |
| 1-4 | 9 m | 8.29 m | 1.20 m | 41.9 dB |
| 1-5 | 8.5 m | 10.10 m | 1.01 m | 32.4 dB |
| 2-3 | 2 m | 2.57 m | 0.71 m | 55.8 dB |
| 2-4 | 12 m | 15.29 m | 2.76 m | 16.7 dB |
| 2-5 | 9 m | 8.91 m | 0.76 m | 37.2 dB |
| 3-4 | 9.5 m | 10.20 m | 1.59 m | 29.1 dB |
| 3-5 | 7.5 m | 7.24 m | 1.41 m | 52.0 dB |
| 4-5 | 2 m | 1.73 m | 1.61 m | 53.2 dB |

As shown in test bed 600 of FIG. 6, each link was obstructed by walls and obstacles. Rooms were separated by 10 cm to 20 cm thick concrete walls. Metal furniture was also present. Thus, the wireless devices were subjected to variable channel conditions, and were further affected by people walking and WLAN interference from other networks. The test bed 600 was controlled via a wired network to separate control data from the wireless channel.

Indoor Evaluation

Distance in the test bed was measured, where each link x-y is illustrated as a link between STAx and STAy. For each link, L-STA 110 sent one unicast ping frame per second (fps) for 400 seconds to an R-STA 190. Results are summarized in Table 2, which shows that the links had a wide range of signal quality, as measured from the ACK SNR, varying from an average of 16.7 dB up to 55.8 dB. Table 2 also shows an average-error of less than 1 m in 8 links out of 10, and a standard deviation that is less than 1.6 m. A higher error was observed for the links STA1-STA5 and STA2-STA4, likely due to multi-path. Particularly, several obstructions were present in the link STA2-STA4, which resulted in a low average SNR of 16.7 dB.

Distance Error Over Time

Figure 7:
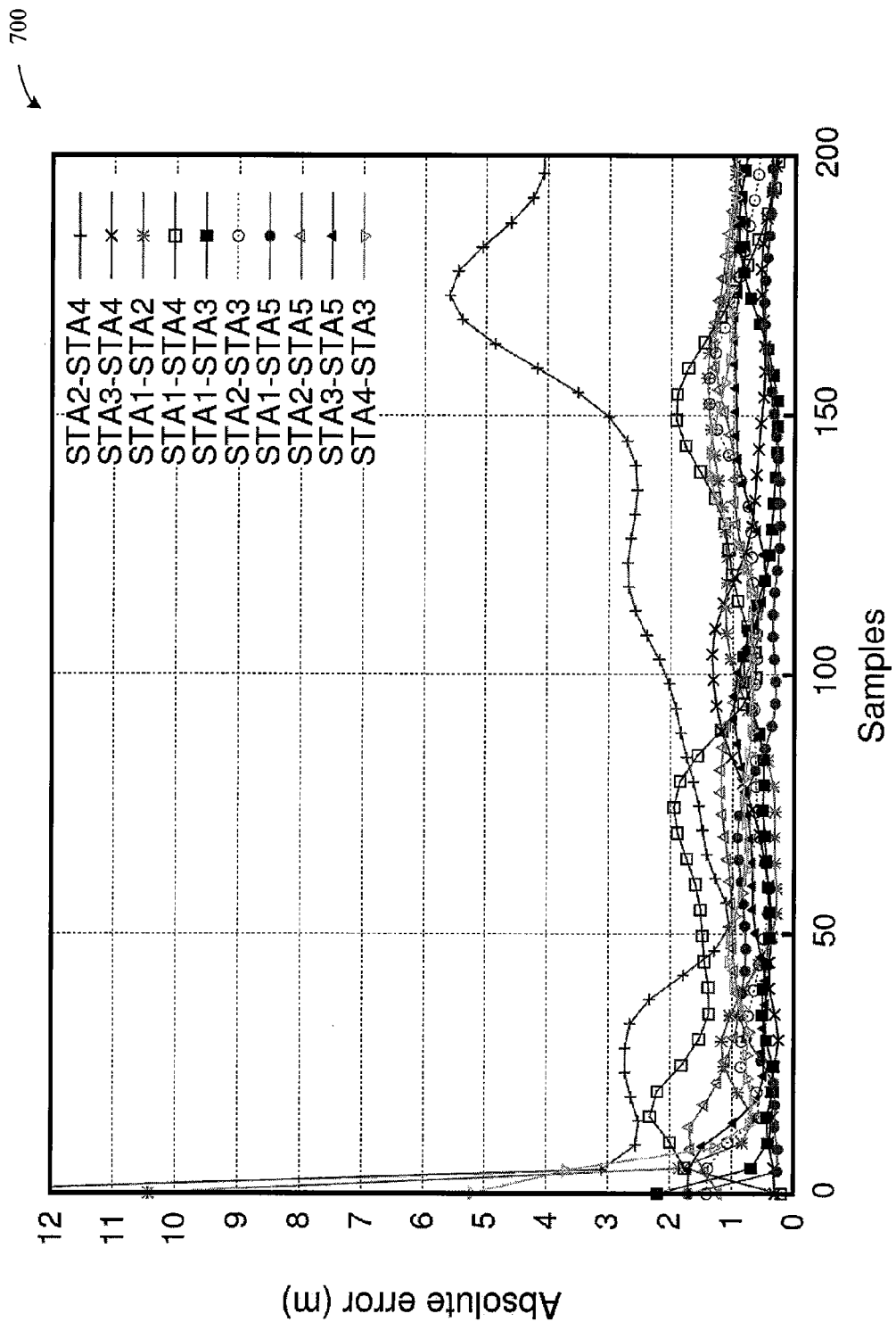
FIG. 7 illustrates a graph that plots an absolute error distance per link versus an average interrupt delay for tests conducted within the test bed of FIG. 6.

FIG. 7 includes a graph 700 that plots, for 200 samples, the absolute error distance per link versus the number of samples. As shown in graph 700, the error drops below 2 m after fewer than 25 samples in 9 links out of 10. On link STA2-STA4—which was a victim of severe multi-path—there was an error of up to 5.5 m. This link was subjected to variability in the distance estimate due to channel variations. As is reflected in Table 2, this caused a higher standard deviation of 2.76 m compared with the other links in the test bed.

Stability

Additionally, tests were performed on link STA1-STA3 at 7 m to verify the robustness of CAESAR with respect to L-STA 110 traffic rate. In the test, traffic was sent for 60 s at various frame rates (1 fps to 1000 fps). Higher frame rates imply higher workload of the L-STA 110 main CPU due to network communication (such as ping packet generation and processing in the kernel), interrupt handling, and the like, where 1000 fps resulted in CPU usage ranging from 50-70%.

Figure 8:
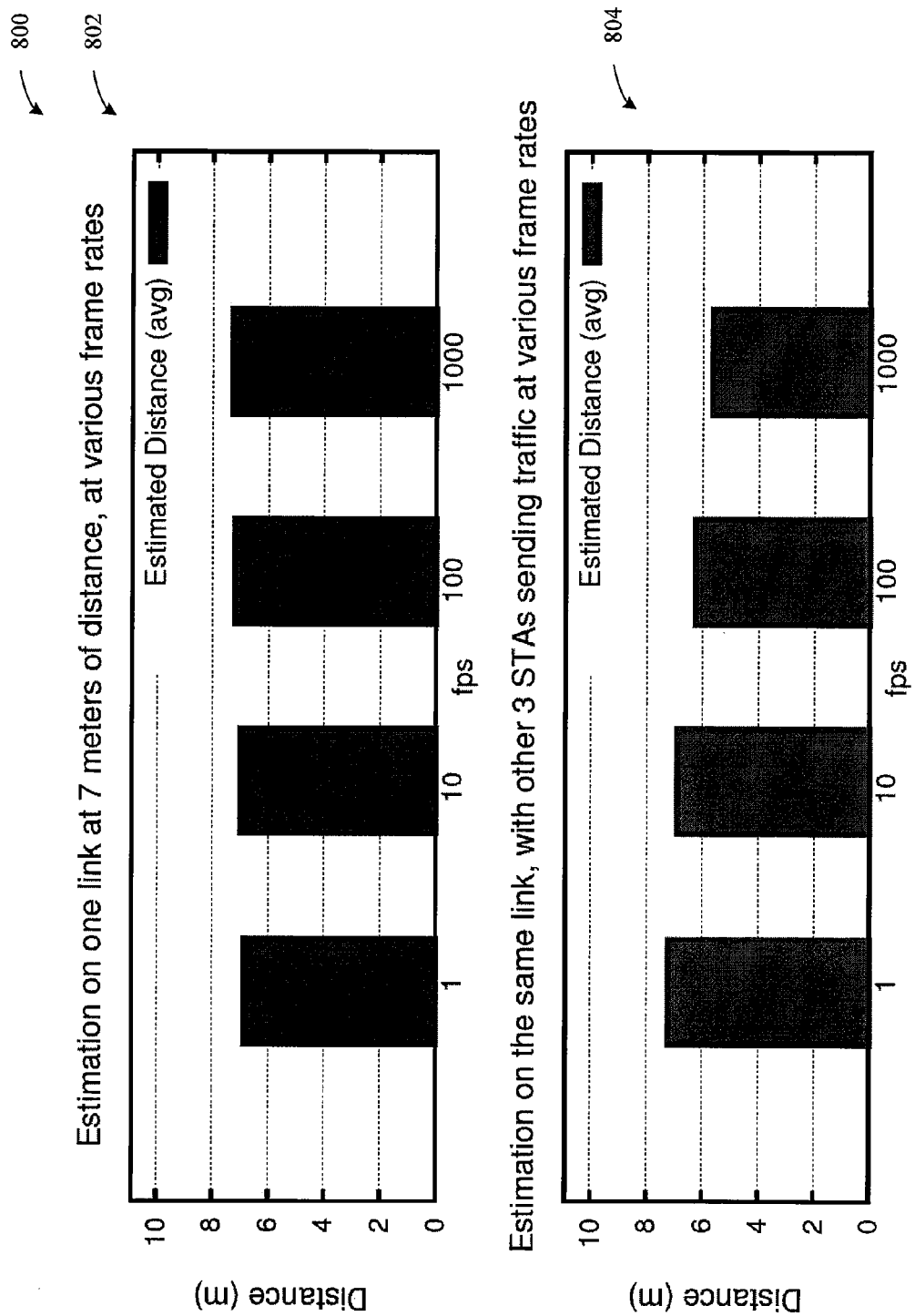
FIG. 8 illustrates graphs that show measured average distances for tests conducted within the test bed of FIG. 6.

The average distance for each test is shown in graphs 800 included in FIG. 8. As shown in graph 802, there was only a slight impact of the frame rate, less than 0.5 m between 1 fps and 1000 fps. Thus, CAESAR is stable across different L-STA 110 workloads, and the results shown in diagram 700 of FIG. 7 can be considered mostly independent of the traffic rate.

Impact of WLAN Interference

In most scenarios, ranging traffic typically coexists with communication traffic, but the estimated distance should not be affected by the presence of the communication traffic. Since CAESAR operates on the MAC idle time between a data/ACK communication, WLAN interference does not directly affect the estimate as long as the ACK is successfully received. However, impact on the estimate can still be observed, which is illustrated in graphs 800 of FIG. 8. In particular, graph 802 illustrates the distance estimate of link STA1-STA3 in FIG. 6 at various frame rates ranging from (1 fps to 1000 fps), while graph 804 illustrates the same distance estimates with the presence of communication traffic. As shown in graph 804, the estimated distance slightly decreased when the network traffic increased. In particular, a difference of ≈1 m was observed for 1000 fps with respect to 1 fps, which resulted in a difference of $t_{MACidle}$ of ≈1/3.4=0.29 WLAN clock tick. A possible explanation for this result is that the high workload of R-STA 190 caused a drift of the WLAN clock, and thus of $t_{SIFS}$.

Distance Tracking of a WLAN Smart Phone

As described above, evaluations of real-time distance estimates from STA4 to a smart phone (STA6) were also performed. In the evaluation, STA4 sent traffic at a low rate of 10 fps to the smart phone. In the first part of the evaluation, the smart phone was in an outdoor position. The outdoor link to STA4 had a clear direct path, but reflections were likely present from the neighboring houses, cars on the street and other people walking in the same area. The initial position of the smart phone was 4 m from STA4 (position A), and a user in possession of the smart phone walked toward and reached position B, which was 78 m from STA4. After being stationary for a few seconds, the user walked back to the original position d and then continued through the path shown in FIG. 6 until going indoor and reaching the final position G, 1 m away from the STA4.

Figure 9:
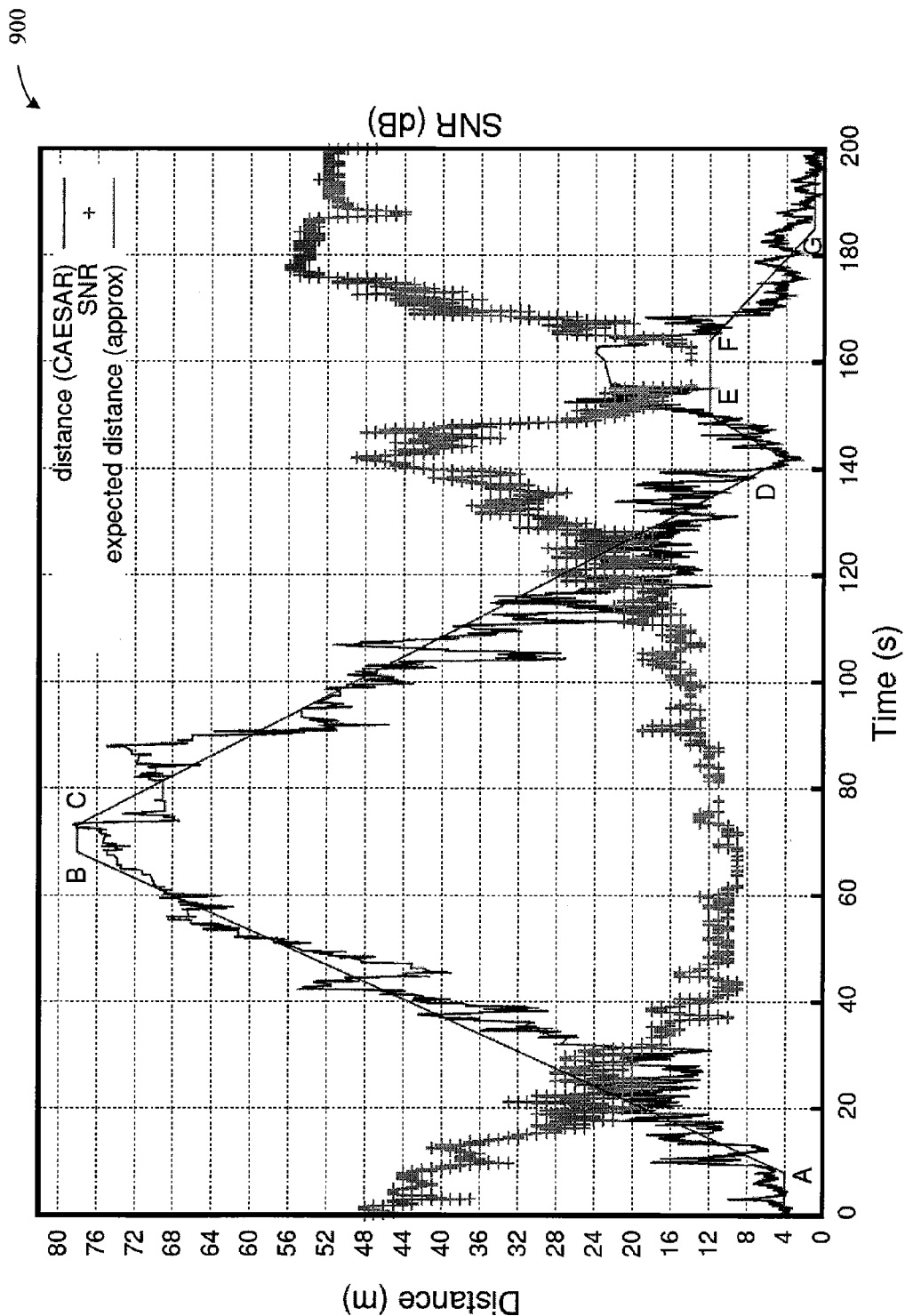
FIG. 9 illustrates a graph that shows the measured estimated distance of the sixth wireless device included in the test bed of FIG. 6.

FIG. 9 includes a graph 900 that illustrates the estimated distances of the smart phone, calculated by CAESAR over time. As described above, in most locations, the average error was within a few meters, and a higher error was found only at around 30 s and 120 s—which was likely due to overestimating the correction factor due to multipath—and 160 s. Particularly, at ≈160 s the smart phone was only ≈12 m away, but the severe building obstructions caused an 802.11 disassociation of the smart phone from the AP (and no data was sent to it). Graph 900 in FIG. 9 also illustrates the SNR during the test (in dB). Whereas there is a small change in the SNR (with a minimum SNR of 8 dB) between 40 s and 100 s, the distance changes rapidly. Moreover, the SNR between 150 s and 165 s is similar to the SNR reported between 40 s and 100 s, while the distance was much smaller due to a severe variation of the channel path loss. This result indicates that a SNR-only ranging technique would not be effective in this environment, whereas CAESAR shows a high robustness during these path loss variations.

Figure 10:
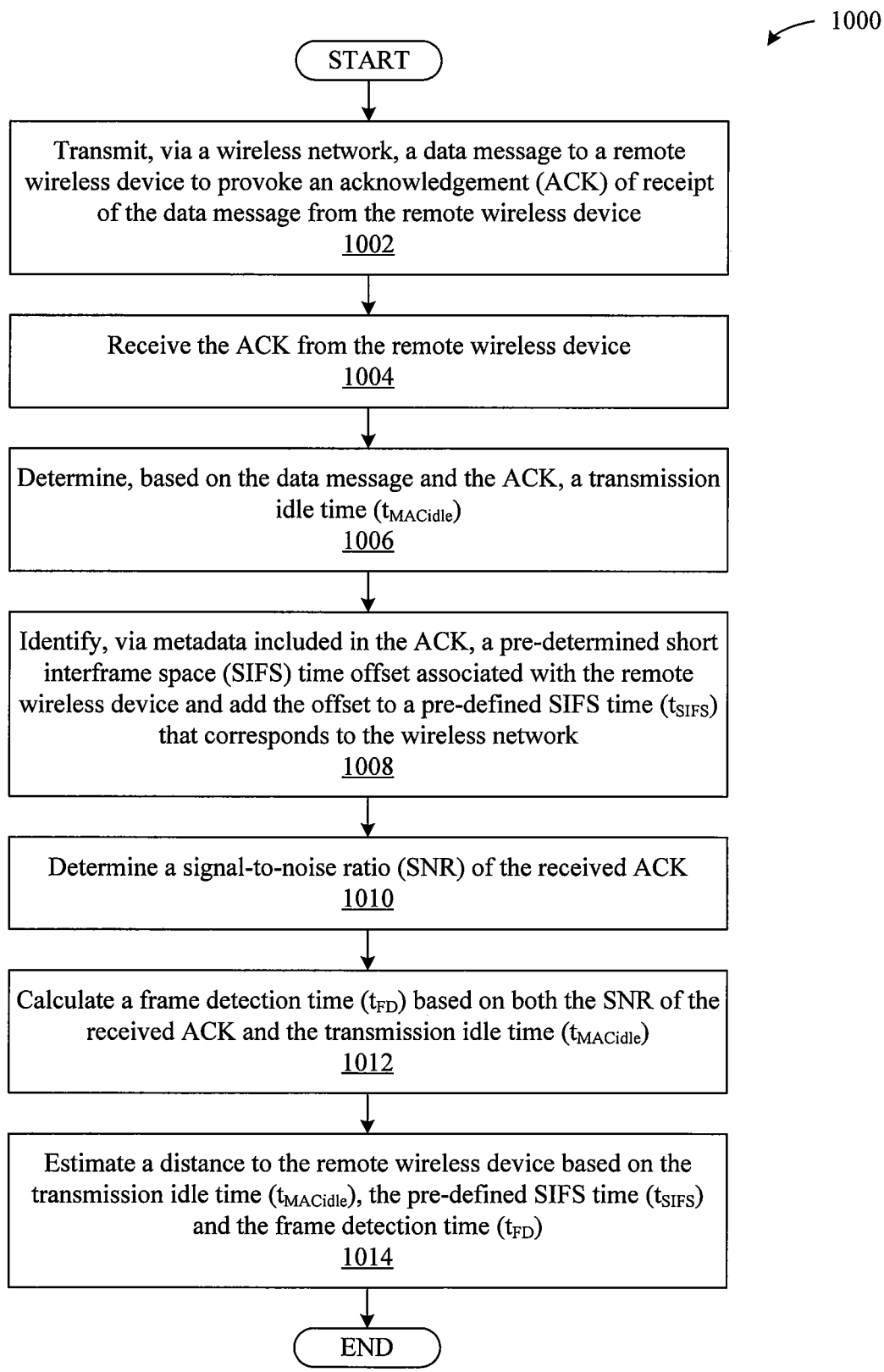
FIG. 10 illustrates a method for estimating the distance between two wireless devices, according to one embodiment.

FIG. 10 includes a method 1000 for estimating the distance between two wireless devices according to embodiments of the invention described herein. As shown, the method 1000 begins at step 1002, where the L-STA 110 transmits, via a wireless network, e.g., an 802.11 wireless network, a data message to a remote wireless device (e.g., an R-STA 190) to provoke an ACK of receipt of the data message from the remote wireless device.

At step 1004, the L-STA 110 receives the ACK from the R-STA 190. At step 1006, the L-STA 110 determines, based on the data message and the ACK, a transmission idle time (i.e., $t_{MACidle}$). At step 1008, the L-STA 110 identifies, via metadata included in the ACK, a pre-determined SIFS offset associated with the remote wireless device and adds the offset to a predefined SIFS time (i.e., $t_{SIFS}$) that corresponds to the wireless network.

At step 1010, the L-STA 110 determines a signal-to-noise ratio (SNR) of the received ACK according to techniques described herein. At step 1012, the L-STA 110 calculates a frame detection time (i.e., $t_{FD}$) based on the both the SNR of the received ACK and $t_{MACidle}$. Again, $t_{FD}$ is calculated according to Table 1, which indicates a value that should be used for $t_{FD}$ based on the SNR and $t_{MACidle}$.

At step 1014, the L-STA 110 estimates a distance to the remote wireless device based on the transmission idle time, the SIFS time and the frame detection time. Again, in one embodiment, the distance is generally calculated according to the equation $\hat{d} = c \cdot (t_{MACidle} - tSIFS - tFD)/2$.

Advantages of various embodiments include better distance measurement accuracy with respect to commercial and prototype solutions for low-cost wireless access technologies. Deployment costs are reduced since the wireless access technologies utilized by embodiments of the invention are already widely-deployed for Internet access, such as smart phones, tablets, and laptop computers. Various embodiments can be applied to low-cost wireless technologies, such as Wi-Fi. Such embodiments are not affected by the workload of the main CPU of the system to which a distance is being calculated. Additionally, various embodiments are not affected when wireless devices transmit on different radio channels such as in frequency division duplexing deployments and where data messages and ACK messages are transmitted at different frequencies. Moreover, embodiments of the invention can be implemented in software.

It should be understood that embodiments as described above can be implemented in the form of control logic using computer software in a modular or integrated manner. Based on the disclosure and teachings provided herein, a person of ordinary skill in the art will know and appreciate other ways and/or methods to implement the invention using hardware and a combination of hardware and software.

Any of the software components or functions described in this application may be implemented as software code to be executed by a processor using any suitable computer language such as, for example, Java, C++ or Perl using, for example, conventional or object-oriented techniques. Time-sensitive functions used by various embodiments can implemented in kernel driver 145s. Non-delay sensitive functions can be implemented using processor executed software code. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations will become apparent to those skilled in the art upon review of the disclosure. The scope should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

Various embodiments may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Persons skilled in the art will understand that various modifications and changes may be made to the embodiments described herein. The foregoing description and drawings are, accordingly, to be regarded in an illustrative rather than a restrictive sense.

What is claimed is:

1. A method of estimating a distance to an electronic device communicating over a wireless network, comprising:
   sending a first message to the electronic device;
   receiving a second message in response to the first message;
   determining, based on timings associated with the first message and the second message, a transmission idle time;
   determining an expected interval associated with the wireless network;
   calculating a frame detection time based on both a measured signal-to-noise ratio of the second message and the transmission idle time; and
   estimating a distance to the electronic device based on the transmission idle time, the expected interval and the frame detection time.

2. The method of claim 1, wherein the first message is a data message, and the second message is an acknowledgement message acknowledging receipt of the data message.

3. The method of claim 1, wherein the first message is a request to send (RTS) control message and the second message is a clear to send (CTS) control message.

4. The method of claim 1, wherein determining the transmission idle time is further based on a clear channel assessment (CCA).

5. The method of claim 1, wherein the electronic device is a mobile device that can be used while being moved relative to an environment.

6. The method of claim 1, wherein the expected interval correlates to a protocol on which the wireless network is based.

7. The method of claim 1, wherein the expected interval is offset based on a manufacturer of the second transmitter.

8. The method of claim 7, wherein the information about the manufacture is used to improve the precision of the estimated distance.

9. A non-transitory computer-readable storage medium storing instructions that, when executed by a processor, cause a computing device to estimate a distance to an electronic device communicating over a wireless network, by performing the steps of:
   sending a first message to the electronic device;
   receiving a second message in response to the first message;
   determining, based on timings associated with the first message and the second message, a transmission idle time;
   determining an expected interval associated with the wireless network;
   calculating a frame detection time based on both a measured signal-to-noise ratio of the second message and the transmission idle time; and
   estimating a distance to the electronic device based on the transmission idle time, the expected interval and the frame detection time.

10. The non-transitory computer-readable storage medium of claim 9, wherein the first message is a data message, and the second message is an acknowledgement message acknowledging receipt of the data message.

11. The non-transitory computer-readable storage medium of claim 9, wherein the first message is a request to send (RTS) control message and the second message is a clear to send (CTS) control message.

12. The non-transitory computer-readable storage medium of claim 9, wherein determining the transmission idle time is further based on a clear channel assessment (CCA).

13. The non-transitory computer-readable storage medium of claim 9, wherein the electronic device is a mobile device that can be used while being moved relative to an environment.

14. The non-transitory computer-readable storage medium of claim 9, wherein the expected interval correlates to a protocol on which the wireless network is based.

15. The non-transitory computer-readable storage medium of claim 9, wherein the expected interval is offset based on a manufacturer of the second transmitter.

16. The non-transitory computer-readable storage medium of claim 15, wherein the information about the manufacture is used to improve the precision of the estimated distance.

17. A system, comprising:
   a first electronic device; and
   a second electronic device, wherein the second electronic device includes a memory storing instructions that, when executed by a processor, cause the second electronic device to estimate a distance to the first electronic device, by performing the steps of:
      sending, at the second electronic device via a first transmitter included in the second electronic device, a first message to the first electronic device;
      receiving, at the second electronic device and via a receiver included in the second electronic device, a second message in response to the first message, wherein the second message is transmitted to the second electronic device via a second transmitter included in the first electronic device;
      determining, based on timings associated with the first message and the second message, a transmission idle time;
      determining an expected interval associated with the wireless network;

calculating a frame detection time based on both a measured signal-to-noise ratio of the second message and the transmission idle time; and estimating a distance to the first electronic device based on the transmission idle time, the expected interval and the frame detection time.

18. The system of claim 17, wherein the first message is a data message, and the second message is an acknowledgement message acknowledging receipt of the data message.

19. The system of claim 17, wherein the first message is a request to send (RTS) control message and the second message is a clear to send (CTS) control message.

20. The system of claim 17, wherein determining the transmission idle time is further based on a clear channel assessment (CCA).

21. The system of claim 17, wherein the first electronic device is a mobile device that can be used while being moved relative to an environment.

22. The system of claim 17, wherein the expected interval correlates to a protocol on which the wireless network is based.

23. The system of claim 17, wherein the expected interval is offset based on a manufacturer of the second transmitter.

24. The system of claim 23, wherein the information about the manufacture is used to improve the precision of the estimated distance.

* * * * *

UNITED STATES PATENT AND TRADEMARK OFFICE
CERTIFICATE OF CORRECTION

PATENT NO. : 9,057,771 B2  
APPLICATION NO. : 13/455033  
DATED : June 16, 2015  
INVENTOR(S) : Giustiniano et al.

Page 1 of 1

It is certified that error appears in the above-identified patent and that said Letters Patent is hereby corrected as shown below:

In the specification
Column 6, Line 48, please delete

" $d = c \cdot (t_{MACidle} - t_{SIFS} - t_{FD})/2$ "

and insert -- $\hat{d} = c \cdot (t_{MACidle} - t_{SIFS} - t_{FD})/2$ -- therefor;

Column 9, Line 30, please delete

" $\hat{d}_{n,s} = c \cdot [(t_{MACidle}\gamma_s) - t_{SIFS} - \bar{t}_{FD,s}]/2 \, s \in S$ "

and insert -- $\hat{d}_{n,s} = c \cdot [(t_{MACidle} - \gamma_s) - t_{SIFS} - \bar{t}_{FD,s}]/2 \; s \in S$ -- therefor;

Column 11, Line 9, please delete

" $t_{MACidle} = I_2 - I_1 [\text{clock cycles}]$ "

and insert -- $t_{MACidle} = I_2 - I_1$ [clock cycles] -- therefor.

Signed and Sealed this  
First Day of December, 2015

Michelle K. Lee  
*Director of the United States Patent and Trademark Office*